United States Patent [19]

Fischer et al.

[11] Patent Number: 5,116,967
[45] Date of Patent: May 26, 1992

[54] METHOD OF MANUFACTURING AN ADJUSTABLE-VISCOSITY CATIONIC STARCH

[75] Inventors: Wolfgang Fischer, Kahl; Dietmar Bischoff, Marktbreit; Michael Huss, Eschborn; Reinhard Stober, Hasselroth; Gert Roessler, Bruehl, all of Fed. Rep. of Germany

[73] Assignee: Degussa Aktiengesellschaft, Frankfurt am Main, Fed. Rep. of Germany

[21] Appl. No.: 524,757

[22] Filed: May 17, 1990

[30] Foreign Application Priority Data

May 31, 1989 [DE] Fed. Rep. of Germany ....... 3917632

[51] Int. Cl.⁵ .............................................. C08B 31/12
[52] U.S. Cl. ..................................... 536/50; 527/300; 527/312
[58] Field of Search .................... 527/312, 300; 536/50

[56] References Cited

U.S. PATENT DOCUMENTS 4,373,099  2/1983  Hubbard et al. ................ 536/105
4,785,087  11/1988  Stober et al. .................... 536/111

Primary Examiner—Nathan M. Nutter
Assistant Examiner—Jeffrey Culpeper Mullis
Attorney, Agent, or Firm—Beveridge, DeGrandi & Weilacher

[57] ABSTRACT

The invention relates to a method of preparing an adjustable-viscosity cationized starch in which, in a process step in the presence of 10 to 35 wt. % water and preferably 0.01 to 2.00 wt. % of a finely-divided silica and/or silicate (in each case relative to the total amount of mixture) the starch is homogenized with an alkaline oxide, hydroxide, silicate aluminate or mixtures thereof, an alkylene epoxide and a peroxo compound or a mixture of at least two peroxo compounds and then boiled in known manner at the desired time.

14 Claims, No Drawings

METHOD OF MANUFACTURING AN ADJUSTABLE-VISCOSITY CATIONIC STARCH

INTRODUCTION AND BACKGROUND

The present invention relates to a method of manufacturing adjustable-viscosity cationic starch.

"Adjustable-viscosity" as the term is used herein means that the starch is chemically or thermally and chemically decomposed to a varying extent, which is a means of adjusting the viscosity of aqueous solutions prepared by using the starch, depending on the desired purpose of the end product.

EP A 0 004 774 describes a method of preparing cationic starch pastes used in paper manufacture, and in which starch slurry is first heated and reacted with ammonium persulphate and then cationised with sodium hydroxide and 3-chloro-2-hydroxypropyl trimethylammonium chloride.

The known reaction products of this type have the disadvantage that they have to be processed immediately afterwards, since they cannot be stored in a feasible way.

SUMMARY OF THE INVENTION

An object of the invention is to provide a method in which pre-reacted starch produced in pulverulent form which can be further processed to obtain the adjustable-viscosity starch at the desired place, e.g. more particularly a paper factory, without adding other chemicals (apart from water).

In attaining the above as well as other objects, one feature of the invention relates to a method of manufacturing an adjustable viscosity cationised starch characterized in that the starch is homogenized with an alkaline oxide, hydroxide, silicate or aluminate or mixtures thereof, an alkylene epoxide and a peroxide compound or a mixture of at least two peroxo compounds.

The process is carried out in the presence of 10 to 35. wt. % water and preferably also in the presence of 0.01 to 2 wt. % finely-divided silica and/or silicate (in each case relative to the total amount of mixture).

Then, at a desired time, the product is boiled in the known manner to produce the final product.

More particularly, the mixture of reactants is homogenized in an intimate mixer for 20 seconds to 35 minutes, then discharged, introduced into the silo or other storage container that can be provided, and thereafter stored preferably at 5° to 40° C.

This is the actual preferred embodiment, which for the first time makes it possible for the starch manufacturer to handle the chemicals, for example in the starch factory, and then to ship the starch to his customer and thereby provide the starch end user (e.g. in the paper factory) with a product ready for use without the need for the customer or end user to carry out additional steps for metering and handling chemicals.

Several weeks at least can elapse between packing the mixture and boiling to a starch paste.

Advantageously and preferably, the process is carried out within the normal room-temperature range of ordinary warehouses, depending on such factors as seasonal fluctuations in environmental temperature, e.g. from 18° to 30° C., more particularly 20° to 25° C.

Tests show that the epoxide reacts completely, whether peroxo compounds are present or not. At a temperature of 20° C., for example, only traces of less than 10 ppm of epoxide per kg starch were detectable after seven days.

Starch produced by the method according to the invention does not have any coarse constituent and can be used without after-treatment such as sieving.

Even after storage for a number of weeks, the properties of starch prepared in accordance with the invention do not alter in such a manner that the viscosity of the starch paste will be expected to undergo an alteration as a function of the duration of storage.

Cationic starch ethers can be manufactured by the method according to the invention by using natural or modified starch or starch-containing substances of any desired origin. It is particularly advantageous to use natural wheat or maize or tapioca or potato or barley starch or mixtures thereof.

According to the invention the starch is etherified with alkylene epoxides having the general formula:

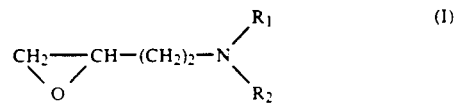

or preferably

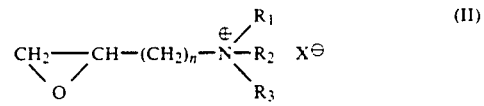

in which n is a number from 1 to 3 and $R_1$, $R_2$ and $R_3$ denote the same or different alkyl radicals with 1 to 4 carbon atoms or $R_1$=benzyl and $X^\ominus$ denotes chloride, bromide, sulphate, sulphamate or acetate, more particularly chloride.

$R_3$ also denotes —$C_2H_2OH$ and —$C_{12}H_{25}$.

These compounds are also used in the form of the corresponding chlorohydrins, adding the amount of alkali necessary for converting them to the epoxide. Conversion to the epoxides of formula (I) or formula (II), which react with the starch, occurs in the reaction medium or earlier.

In carrying out the process of the invention, 0.005 to 0.500 mol of epoxide according to formula (I) or (II), preferably 0.01 to 0.03 mol epoxide, is used per mol of starch, calculated as an anhydroglucose unit. The resulting degree of substitution (DS) is from 0.005 to 0.300, preferably 0.01 to 0.03.

According to the invention, the starch is etherified with the alkylidene epoxides in a medium containing 10 to 35 wt. %, more particularly 20 to 25 wt. %, of water and 0.2 to 2.0 wt. %, more particularly 0.4 to 1.5 wt. % of an alkali-metal or alkaline earth metal hydroxide or oxide, more particularly calcium oxide or calcium hydroxide, or an alkali-metal or alkaline earth-metal metasilicate, more particularly sodium metasilicate or sodium aluminate or a mixture of these substances.

In addition to these known components, it is desirable to add 0.01 to 2.0 wt. %, preferably 0.1 to 0.5 wt. %, of a finely divided silica or silicate to the reaction mixture, relative to the total amount thereof.

Advantageously the silicas are precipitated or prepared by flame hydrolysis, and are hydrophilic or hydrophobic.

The specific surface areas of the silicas are between 60 and 700 m²/g, preferably 100 and 450 m²/g (BET measurement) to DIN 66 131, N₂ adsorption at the temperature of liquid nitrogen and previous heating of the sample at 110° C.

Hydrophilic precipitated silicas are preferred having a specific surface area of 190 to 450 m²/g, more particularly spray-dried precipitated silica having a specific surface area of 190 m²/g (BET).

Mixtures of hydrophobic and hydrophilic silicas are also suitable for purposes of the invention.

Examples of suitable silicates are aluminum silicates, e.g. P 820 (Degussa) (BET surface area: 110 m²/g), or sodium silicates, e.g. Silteg ®AS7, (BET surface area: 60 m²/g).

It is preferable to use a pulverulent mixture of silica and/or silicates and the alkaline oxide or hydroxide, more particularly calcium hydroxide or calcium oxide or sodium metasilicate or a mixture of these compounds (hereinafter called the activator).

The activator contains 1 to 50 wt. %, preferably up to 10 wt. %, of silica and/or silicates. The remainder up to 100% is made up by the alkaline constituent.

The activator need not be in powder form. In suitable cases, the alkaline constituent may also be aqueous caustic soda solution.

It should be remembered, however, that the amount of activator used is always that which give a pH of 8 or more (5 wt. %, starch suspension) in the end product.

More particularly, the following peroxo compounds are used:

Sodium peroxodisulphate, $Na_2S_2O_8$
Potassium peroxodisulphate, $K_2S_2O_8$
Sodium peroxocarbonate, $Na_2C_2O_6$
Potassium peroxocarbonate, $K_2C_2O_6$
Ammonium peroxodisulphate, $(NH_4)_2S_2O_8$
Potassium monopersulphate (caroate), $2KHSO_5$, $KHSO_4$, $K_2SO_4$ individually or in a mixture.

More particularly, mixtures of sodium peroxodisulphate and sodium peroxocarbonate are used in a ratio by weight of 1:1 to 1:10, preferably 1:2 to 1:4. These combinations, when boiled, yield white paste with a relatively small amount of peroxo compounds. Admittedly, white paste is obtained when percarbonate is used alone, but in considerably larger quantities if the same low viscosity is to be obtained.

The peroxo compounds are used in a proportion of 0.01 to 4.0 wt. %, more particularly 0.1 to 1.0 wt. %, relative to absolute dry starch. They are used in the form of powders or aqueous solutions. The method according to the invention is not affected by the sequence in which this reagent and the other reagents are added to the starch.

The intimate mixer can e.g. a ploughshare mixer (continuous or discontinuous), or a flow-moistening mixer (continuous). Suitable intimate mixers are known in the art.

It has been found advantageous, however, in the case of batch mixtures, to mix the starch, activator and peroxo compound together beforehand for up to 10 minutes, and then to spray on the epoxide, e.g. in the form of aqueous solutions, and then to homogenize the mixture.

DETAILED EMBODIMENTS OF INVENTION

The present invention will be further understood by reference to the illustrative examples.

EXAMPLES

TABLE 1

| The following types of activator were used for the cationisation reaction | |
|---|---|
| Type | Composition (wt. %) |
| A-1 | 96.2% calcium hydroxide, 97% |
|  | 3.8% silica, hydrophylic, spray-dried |
|  | Specific surface area: 190 m²/g (BET) |
| A-2 | 32.5% calcium hydroxide, 97% |
|  | 65.0% sodium metasilicate |
|  | 2.5% silica, hydrophilic, spray-dried |
|  | Specific surface area: 190 m²/g (BET) |

In Examples 1-6, various types of starch were cationised with standard activators by the dry method. Various amounts of sodium peroxodisulphate were added to the mixtures. After reacting for 3 days at 20° C., the yield from the cationisation reaction and the decomposition of the starch were measured.

EXAMPLE 1

50 kg (0.2633 kmol) of natural potato starch (water content 14.6%) was placed in a mixer. After adding 0.171 kg of activator A-1, mixing was continued for 5 minutes and 4.604 kg of a reagent solution containing 0.426 kg of 2,3-epoxypropyl trimethylammonium chloride (0.00281 kmol) was added within 5 minutes through a nozzle when the mixer was rotating. Mixing was continued for a further 10 minutes, then the mixture was poured into a storage silo. After standing for 3 days, the yield from the cationisation reaction was found by analysis to be 93.8%. The degree of substitution of the castionised starch was 0.010. The starch content was about 78.6%. After boiling a 25 wt. % starch slurry (ph 10.8) at 6.5 bar and 130° C., the starch paste was diluted to 7 wt. % and the viscosity was measured after Brookfield at 100 rpm: 80° C.=870 mPas (spindle RV3), 50° C.=1880 mPas (spindle RV4).

EXAMPLE 1a

The procedure was the same as in Example 1 except that 0.10% sodium peroxodisulphate, relative to absolute dry starch, was added to the mixture. The yield from the cationisation reaction was 95. The viscosity of a 7 wt. % starch paste was: 80° C.=100 mPas (spindle RV2), 50° C.=152 mPas (spindle RV2).

EXAMPLE 1b

The procedure was the same as in Example 1 except that 0.30% sodium peroxodisulphate, relative to absolute dry starch, was added to the mixture. The yield from the cationisation reaction was 95%. The viscosity of a 7 wt. % starch paste was: 80° C.=36 mPas (spindle RV1), 50° C.=56 mPas (spindle RV1).

EXAMPLE 1c

The procedure was the same as in Example 1 except that 0.50% sodium peroxodisulphate, relative to absolute dry starch, was added to the mixture. The yield from the cationisation reaction was 95.4%. The viscosity of a 7 wt. % starch paste was: 80° C.=25 mPas (spindle RV1), 50° C.=29 mPas (spindle RV1).

EXAMPLE 2

The procedure was as in Example 1 except that 0.256 kg of activated A-2 relative to absolute, dry starch was added to the mixture.

The yield from the cationisation reaction was 85.4%. The viscosity of a 7 wt. % starch paste was: 80° C.=1160 mPas (spindle RV4), 50° C.=2640 mPas (spindle RV5).

EXAMPLE 2a

The procedure was as in Example 2, except that 0.30% sodium peroxodisulphate, relative to absolute dry starch, was added to the mixture. The yield from the cationisation reaction was 88.3%. The viscosity of a 7 wt. % starch paste was 80° C.=41 mPas (spindle RV1), 50° C.=55 mPas (spindle RV1).

EXAMPLE 3

50 kg (0.2723 kmol) of natural wheat starch (water content 11.7%) was placed in a mixer. After adding 0.287 kg of activator A-1, mixing was continued for 5 minutes and 3.743 kg of a reagent solution containing 0.450 kg of 2,3-epoxypropyl trimethylammonium chloride (0.00297 kmol) was added within 5 minutes through a nozzle when the mixer was rotating. Mixing was continued for a further 10 minutes, then the mixture was poured into a storage silo. After standing for 3 days, the yield from the cationisation reaction was found by analysis to be 91.7%. The degree of substitution of the cationised starch was 0.010. The starch content was about 82.5%. After boiling a 25 wt. % starch slurry (ph 11.2) at 6.5 bar and 130° C., the starch paste was diluted to 7 wt. % and the viscosity was measured after Brookfield at 100 rpm: 80° C.=181 mPas (spindle RV2), 50° C.=502 mPas (spindle RV3).

EXAMPLE 3a

The procedure was as in Example 3 except that 0.10% sodium peroxodisulphate, relative to absolute dry starch, was added to the mixture. The yield from the cationisation reaction was 91.8%. The viscosity of a 7 wt. % starch paste was: 80° C.=80 mPas (spindle RV1), 50° C.=122 mPas (spindle RV2).

EXAMPLE 3b

The procedure was as in Example 3 except that 0.30% sodium peroxodisulphate, relative to absolute dry starch, was added to the mixture. The yield from cationisation reaction was 92.7%. The viscosity of a 7 wt. % starch paste was: 80° C.=40 mPas (spindle RV2), 50°=60 mPas (spindle RV3).

EXAMPLE 3c

The procedure was as in Example 3 except that 0.50% sodium peroxodisulphate, relative to absolute dry starch, was added to the mixture. The yield from the cationisation reaction was 92.7%. The viscosity of a 7 wt. % starch paste was: 80° C.=26 mPas (spindle RV1), 50° C.=37 mPas (spindle RV1).

EXAMPLE 4

The procedure was the same as in Example 3, except that 0.442 kg of activator A-2, relative to absolute dry starch, was added to the mixture. The yield from the cationisation reaction was 90.9%. The viscosity of a 7 wt. % starch paste was: 80° C.=251 mPas (spindle RV2), 50° C.=642 mPas (spindle RV3).

EXAMPLE 4a

The procedure was the same as in Example 4, except that 0.30% sodium peroxodisulphate, relative to absolute dry starch, was added to the mixture. The yield from the cationisation reaction was 92.4%. The viscosity of a 7 wt. % starch paste was: 80° C.=36 mPas (spindle RV1), 50° C.=54 mPas (spindle RV1).

EXAMPLE 5

50 kg (0.2677 kmol) of natural maize starch (water content 13.2%) was placed in a mixer. After adding 0.326 kg of activator A-1, mixing was continued for 5 minutes and 0.2862 kg of a reagent solution containing 0.467 kg of 2,3-epoxypropyl trimethylammonium chloride (0.00308 kmol) was added within 5 minutes through a nozzle when the mixer was rotating. Mixing was continued for a further 10 minutes, then the mixture was poured into a storage silo. After standing for 3 days, the yield from the cationisation reaction was found by analysis to be 87.0%. The degree of substitution of the cationised starch was 0.010. The starch content was about 82.4%. After boiling a 25 wt. % starch slurry (ph 11.4) at 6.5 bar and 130° C., the starch paste was diluted to 7 wt. % and the viscosity was measured after Brookfield at 100 rpm: 80° C.=184 mPas (spindle RV2), 50° C.=470mPas (spindle RV3).

EXAMPLE 5a

The procedure was as in Example 5, except that 0.10% sodium peroxodisulphate, relative to absolute dry starch, was added to the mixture. The yield from the cationisation reaction was 88.1%. The viscosity of a 7 wt. % starch paste was: 80° C.=80 mPas (spindle RV1), 50° C.=126 mPas (spindle RV2).

EXAMPLE 5b

The procedure was as in Example 5, except that 0.30% sodium peroxodisulphate, relative to absolute dry starch, was added to the mixture. The yield from the cationisation reaction was 88.8%. The viscosity of a 7 wt. % starch paste was: 80° C.=40 mPas (spindle RV1), 50° C.=58 mPas (spindle RV1).

EXAMPLE 5c

The procedure was as in Example 5, except that 0.50% sodium peroxodisulphate, relative to absolute dry starch, was added to the mixture. The yield from the cationisation reaction was 90.1%. The viscosity of a 7 wt. % starch paste was: 80° C.=28 mPas (spindle RV1), 50° C.=38 mPas (spindle RV1).

EXAMPLE 6

The procedure was as in Example 5, except that 0.499 kg of activator A-2, relative to absolute dry starch, was added to the mixture. The yield from the cationisation reaction was 85.4%. The viscosity of a 7 wt. % starch paste was: 80° C.=202 mPas (spindle RV2), 50° C.=48 mPas (spindle RV3).

EXAMPLE 6a

The procedure was as in Example 6, except that 0.30% sodium peroxodisulphate, relative to absolute dry starch, was added to the mixture. The yield from the cationisation reaction was 87.2%. The viscosity of a 7 wt. % starch paste was: 80° C.=42 mPas (spindle RV1), 50° C.=64 mPas (spindle RV1).

EXAMPLE 7

The procedure was as in Example 1, except that 2.0% potassium monopersulphate (caroate) relative to absolute dry starch, was added to the mixture. The yield in the cationisation reaction was 94.3%. The viscosity of 7 wt. % starch paste was: 80° C. = 29 mPas (spindle RV1), 50° C. = 41 mPas (spindle RV1).

EXAMPLE 8

The procedure was the same as in Example 1, except that 2.0% of sodium peroxocarbonate, relative to absolute dry starch was added to the mixture. The yield from the cationisation reaction was 94.7%. The viscosity of a 7 wt. % starch paste was: 80° C. = 31 mPas, 50° C. = 42 mPas (spindle RV1). The resulting paste was white.

EXAMPLE 9

The procedure was the same as in Example 1, except that 0.8% of a mixture of 75 wt. % sodium peroxocarbonate and 25 wt. % sodium peroxodisulphate, relative to absolute dry starch was added to the mixture. The yield from the cationisation reaction was 94.2%. The viscosity of a 7 wt. % starch paste was: 80° C. = 27 mPas, 50° C. = 40 mPas (spindle RV1). The resulting paste was white.

Further variations and modifications of the foregoing will be apparent to those skilled in the art and are appended hereto.

German priority application P 39 17 632.0 is relied in and incorporated herein by reference.

We claim:

1. A method of manufacturing an etherified starch capable of conversion to an adjustable-viscosity cationised starch in pulverulent form, comprising the process step of mixing starch, with an alkylene epoxide and a peroxo compound or a mixture of peroxo compound or a mixture of peroxo compounds in the presence of 10 to 35 wt. % water, an alkaline oxide, alkaline hydroxide, alkaline silicate, alkaline aluminate or mixtures thereof, to form an admixture, homogenizing said admixture.

2. The method according to claim 1, further comprising homogenizing in the presence of 0.1 to 2.0 wt. % of at least one of a finely divided silica or silicate, relative to the total amount of mixture.

3. The method according to claim 1 wherein the homogenizing of the mixture of starch, alkaline compound, at least one of silica silicate, peroxo compound and alkylidene epoxide is carried out in an intimate mixer for between 20 seconds and 25 minutes.

4. The method according to claim 1 wherein the alkylene epoxide has the formula:

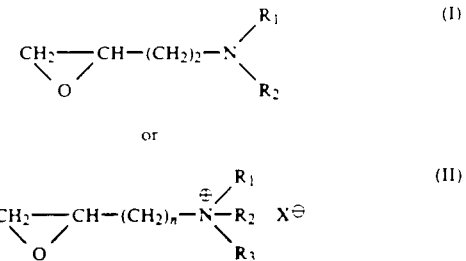

in which n = 1, 2, or 3, $R_1$, $R_2$ and $R_3$ denote the same or different alkyl radicals with 1 to 4 carbon atoms or $R_1$ = benzyl radical, $-CH_2CH_2-OH$ or $-C_{12}H_{25}$ and $X^{\ominus}$ denotes chloride, bromide, sulphate, sulphamate or acetate.

5. The method according to claim 4, further comprising that the chlorohydrins corresponding to formulae (I) and (II) are used together with the amount of alkali necessary for converting them to the corresponding epoxide.

6. The method according to claim 1 wherein a hydrophilic finely-divided silica is present.

7. The method according to claim 1 wherein the peroxo compound is selected from the group consisting of:
Sodium peroxodisulphate, $Na_2S_2O_8$
Potassium peroxodisulphate, $K_2S_2O_8$
Sodium peroxocarbonate, $Na_2C_2O_6$
Potassium peroxocarbonate, $K_2C_2O_6$
Ammonium peroxodisulphate, $(NH_4)_2S_2O_8$
Potassium monopersulphate (caroate), $2KHSO_5 \cdot KHSO_4 \cdot K_2SO_4$
or mixtures thereof.

8. The method according to claim 7, wherein sodium peroxodisulphate and sodium peroxocarbonate are used in a ratio by weight of 1:1 to 1:10.

9. The method according to claim 1 wherein a ploughshare mixer is used for homogenizing.

10. The method according to claim 1 wherein a flow-moistening mixer is used for homogenizing.

11. The method according to claim 1 wherein an alkali metal or alkaline earth metal hydroxide, oxide, metasilicate, aluminate or mixture thereof is present.

12. The method of making an adjustable-viscosity cationised starch comprising boiling the etherified starch produced by the method of claim 1.

13. A pulverulent etherified starch produced by the method according to claim 1.

14. The method according to claim 1 further characterized by first mixing the starch, alkaline compound and peroxo compound together to form a mixture and then spraying an aqueous solution of the epoxide onto said mixture and thereafter homogenizing.

* * * * *